United States Patent [19]

Pentecost

[11] 4,004,852
[45] Jan. 25, 1977

[54] INTEGRATED AUTOMATIC RANGING DEVICE FOR OPTICAL INSTRUMENTS

[75] Inventor: Eugene E. Pentecost, Anaheim, Calif.

[73] Assignee: Rockwell International Corporation, El Segundo, Calif.

[22] Filed: June 30, 1975

[21] Appl. No.: 591,578

[52] U.S. Cl. .................................. 356/1; 250/201; 250/578; 354/25; 356/4

[51] Int. Cl.² ..................... G01C 3/00; G03B 7/08

[58] Field of Search ................... 356/1, 4, 144, 163; 354/25; 250/578, 201

[56] References Cited

UNITED STATES PATENTS

| | | | |
|---|---|---|---|
| 3,553,455 | 1/1971 | Sato et al. | 250/201 |
| 3,684,374 | 8/1972 | Humphrey | 356/4 |
| 3,838,275 | 9/1974 | Stauffer | 352/140 |
| 3,846,628 | 11/1974 | Towne | 354/25 |
| 3,898,676 | 8/1975 | Machida et al. | 354/25 |
| 3,907,434 | 9/1975 | Coles | 356/4 |
| 3,945,023 | 3/1976 | Stauffer | 356/4 |

Primary Examiner—Maynard R. Wilbur
Assistant Examiner—S. C. Buczinski
Attorney, Agent, or Firm—H. Fredrick Hamann; G. Donald Weber, Jr.; Robert Ochis

[57] ABSTRACT

An automatic ranging device for optical instruments focuses two images of at least a portion of the field of view of the instrument on an array of photosensitive cells. The electronic output of the individual cells is related to the intensity of the light impinging thereon. The electronic output corresponding to the first image is compared with the electronic output corresponding to the second image. The relative location of corresponding portions of the first and second images is a measure of the range to the object which is imaged. Electronic circuitry determines the location at which image coincidence occurs and controls the focus of the optical instrument accordingly.

11 Claims, 5 Drawing Figures

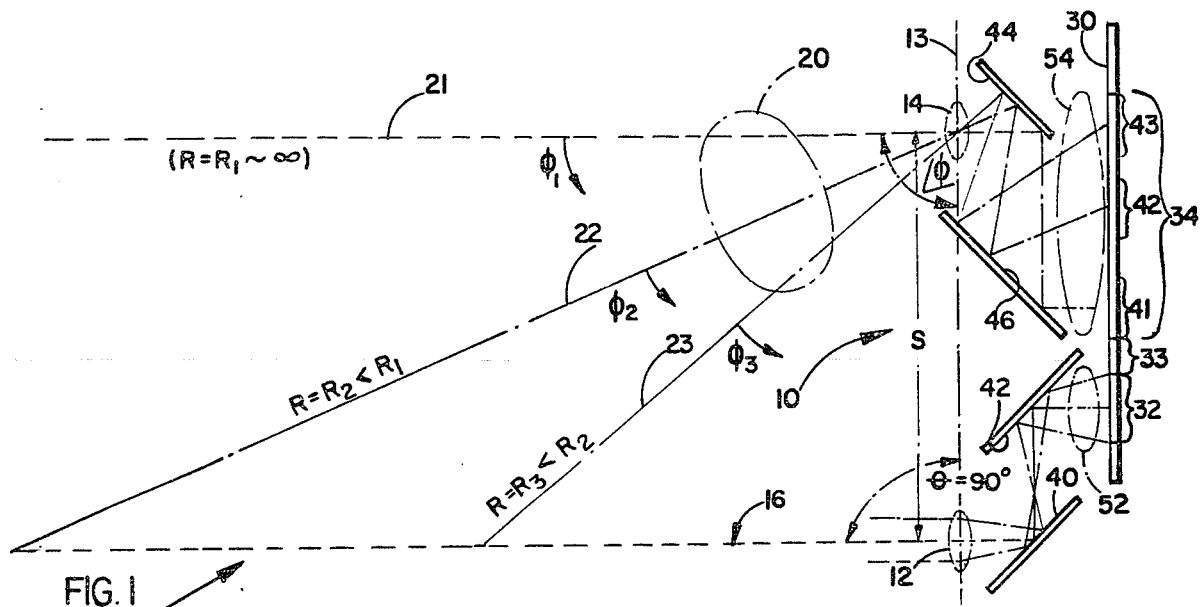

INTEGRATED AUTOMATIC RANGING DEVICE FOR OPTICAL INSTRUMENTS

BACKGROUND OF THE INVENTION

1. Field of the Invention

The invention relates to the field of optical instrument focusing systems.

2. Prior Art

Prior art optical instrument focusing systems are of two kinds, mechanically aided, but operator controlled, and fully automatic.

Mechanically aided, operator controlled, focusing systems are of many varieties. These varieties include double image, split image and broken image systems. In each of these systems, the operator must adjust the focus of the optical system until the operator determines that the optimum image has been achieved. In double image systems, the elimination of the double image is the criterion which the operator must use. In split image systems, the operator must align separate portions of the image to achieve a unitary image. In broken image systems the operator must adjust the focus to yield an image which to the operator's eye is the clearest image.

Automatic focusing systems have utilized moving lenticular screens disposed between a photocell and a lens system at the location where the focus of the image is positioned when the optical instrument is in focus. Such systems make use of the fact that at the focus of an image projected by a lens system the image is a point. When the focus of the image is at the lenticular screen, the image passing through the lenticular screen suffers a minimum of variation in image intensity. However, when the focus of the image is displaced for the lenticular screen, the image passes through portions of the screen having differing focal points and the image is distorted. A photocell placed in the path of the image transmitted by the lenticular screen provides an output signal which is dependent on the position of the focus of the image relative to the lenticular screen. With a motor driven lens focusing system, the motor is automatically stopped at the lens position which is determined on the basis of the photocell output as corresponding to the best focus. Unfortunately, such systems have a disadvantage in that in order to establish that an image is in proper focus the lens must be moved out of focus because the system determines focus on a relative not an absolute basis. During focusing, the rate at which the lens focus is adjusted must be limited to a low enough rate that the optimum focus can be detected in time to stop the lens motion before the lens passes out of focus or else the focusing motor must be reversed to bring the image back into focus. Such systems have a further disadvantage that when the lens is adjusted by the motor, it cannot be determined a priority in which direction the motor should adjust the focus. Therefore, on the average one-half of the time the motor will begin by adjusting the lens focus in the wrong direction, in consequence, the motor must be stopped and reversed with attendant disadvantages with respect to vibration power consumption and focusing time.

SUMMARY OF THE INVENTION

The problems of prior art focusing systems for optical instruments such as cameras are overcome by the present invention through the elimination of mechanical adjustments during the determination of the range from the optical instrument to the object on which the instrument is to be focused. This is achieved by an all electronic range determination system. The optical instrument is set to be in focus at the range of the object being viewed as determined by the electronic range determination system. The range is preferably determined through use of a double image system in which a first image of the object whose range is to be determined is focused on a first image sensor and a second image of the object which includes at least a portion of the first image is focused on a second image sensor. The location of the first image within the second image is controlled by the distance from the range determination system to the object. The first and second images are electronically correlated or compared to determine where within the second image the first image occurs. Once the location of the first image within the second image is determined, the range to the object is known or can be determined from a predetermined relationship between position of the first image in the second image and the distance to the object. This range information is then utilized in focusing the optical instrument. Such focus is preferably achieved automatically, but may be achieved by operator adjustment.

BRIEF DESCRIPTION OF THE DRAWINGS

FIG. 1 is a schematic diagram of an optical system which may be utilized to generate raw ranging data in accordance with the invention.

FIG. 2 is a block diagram of a data reduction and optical instrument control system which may be utilized to reduce the raw data to range information and to adjust the optical instrument accordingly.

FIG. 3 is an illustration of a photosensor array which aids in resolving one type of range ambiguity.

FIG. 4 illustrates a photosensor array for use in a split image embodiment.

FIG. 5 illustrates a photosensor array for use in a split image embodiment having less stringent photosensor alignment requirements than those of the array of FIG. 4.

DETAILED DESCRIPTION OF THE PREFERRED EMBODIMENT

A preferred optical system for generating raw ranging data in accordance with the invention is illustrated generally at 10 in FIG. 1. Optical system 10 comprises first and second lenses 12 and 14 which are laterally displaced from each other by a separation distance S in order to generate separate subject (52) and range (54) images, respectively, of an object to be ranged. In the preferred embodiment, lenses 12 and 14 are centered on a common line 13 with their axes aligned perpendicular to common line 13 and displaced from each other by the distance S. Because of the separation between lenses 12 and 14, the subject and range images are generated along differing sightlines 16 and 20, respectively. In this preferred embodiment, the position of sightline 16 for the subject image is always the same independent of the distance to the object being ranged and lies along the axis of lens 12. The position of sightline 20 varies in accordance with the range of the object to be ranged and is disposed at an angle $\phi$ relative to common line 13. The angle $\phi$ varies in accordance with the range R to the object being ranged. When the object being ranged is at a range $R_1$ from optical system 10 which is essentially infinite, sightline 20 coincides with line 21 which is along the axis of lens 14 and is thus parallel to sightline 16. With the object to be ranged at the range $R_1$ the angle $\phi$ is equal to the $\phi_1$ and is 90°. When the object to be ranged is at some range $R_2$ from optical system 10 which is less than range $R_1$, sightline 20 coincides with line 22 for which the angle $\phi$ is equal to $\phi_2$ which is less than 90°. When the object to be ranged is at some range $R_3$ which is less than range $R_2$, sightline 20 is along line 23 for which the angle $\phi$ is equal to $\phi_3$ which is less than $\phi_2$.

In order to accurately focus an optical instrument using the range data provided by the automatic ranging system in accordance with this invention, (in order to assure that the image of the object will not be blurred) the separation between lenses 12 and 14 must be selected such that the angle $\phi$ of sightline 20 to the object being ranged is detectably different from the angle $\phi$ the sightline 20 would assume for an object at any range that would require a different focus setting of the optical instrument.

The subject image 52 and range image 54 generated respectively by lenses 12 and 14 are focused on a photosensor array 30 comprised of a plurality of photocells each of which detects the intensity of the light from the object which strikes that photocell. Photosensor array 30 may preferably comprise a single row of sensor cells in order to simplify the electronic data reduction system. However, it will be understood that any sensor array configuration may be used so long as it is compatible with the data reduction system which is utilized.

It is preferred to use a folded optical system to focus the images on the array 30. A folded optical system minimizes the optical system depth and allows a single photosensor array which is shorter than the distance S to be utilized to sense both the subject and the range images. The preferred folded optical system employs two critical angle reflecting mirrors associated with each lens. A first mirror 40 associated with lens 12 reflects the subject image from lens 12 essentially perpendicular to sightline 16 and a second mirror 42 re-reflects the subject image essentially parallel to sightline 16 and onto photosensor array 30. Similarly, a first mirror 44 associated with lens 14 reflects the range image from lens 14 off-angle from sightline 20 and a second mirror 46 re-reflects the range image approximately parallel to sightline 20 and onto photosensor array 30. As illustrated in FIG. 1, after reflection from mirrors 42 and 46 the light comprising each of the images travels in substantially the same direction as that in which it traveled prior to entering the lenses. However, if desired the mirrors 42 and 46 could be re-oriented 90° from the position shown in order to reflect the images such that after reflection from mirrors 42 and 46 the light travels in substantially the opposite direction to the direction in which it travels prior to entering the lenses. In such an embodiment, photosensor array 30 may be conveniently placed on or near the common line 13 through the center of lenses 12 and 14.

It will be understood that although folded optical system 10 is preferred, other optical systems may be utilized. Where a single large array 30 or two separate arrays are utilized to sense subject image 52 and range image 54, the images from lenses 12 and 14 can be focused directly onto the sensor array without the use of folded optics.

The use of a single sensor array is preferred for several reasons. First, uniformity in the photoresponse of the individual sensor cells is more easily obtained in a single array than in two separate arrays. Second, misalignment of the sensing array relative to the optical system can cause the subject and range images to be derived from different portions of the object and the chances of such misalignment occurring are increased by the use of separate sensor arrays. Third, utilization of a single array and folded optics allows the overall dimensions of optical system 10 to be minimized. The minimization of the overall dimensions of the optical system is of particular benefit where it is desired to incorporate the optical system within a photographic camera. With a folded optical system, many popular size cameras can be adapted to utilize the inventive ranging system without requiring a significant change in the dimensions of the camera body.

The subject image from lens 12 is focused on a subject region 32 of photosensor array 30. Region 32 contains enough sensing cells of sufficiently small dimensions to provide a detailed representation of the object to be ranged. There are preferably at least 20 photosensitive cells within region 32.

The range image from lens 14 is focused on a range region 34 of image array 30. In this embodiment, the range region 34 is substantially longer than the subject region 32 in order to simplify the electronic processing of the data generated by optical system 10. However, it will be understood that any subject image and range image sensor configuration may be used, so long as it is compatible with the data reduction system which it utilized. In the present embodiment range region 34 is preferably on the order of three or more times as long as subject region 32. Regions 32 and 34 preferably each comprise a plurality of photosensor cells which are identical in photoresponse, area and spacing.

The subject image portion 32 of photosensor array 30 is preferably separated from the range image portion 34 of photosensor array 30 by an unused portion 33 of the photosensor array. The separation between subject image 32 and range imager 34 prevents overlapping of light from lens 14 with the subject image 52 and the overlapping of light from lens 12 with the range image 54 either of which would result in a smeared image and reduced resolution.

The position within region 34 of the portion of the range image which is essentially a duplicate of the subject image is a function of the range to the object being ranged. Where the object is at the range $R_1$ which is essentially infinite, the subject portion of the range image will appear in a portion 41 or region 34 which is at one end of range region 34. Where the object is at a minimum range $R_3$, the subject portion of the range image will appear in a portion 43 of region 34 which is at the opposite end of range region 34 from portion 41. Where the object is at the intermediate range $R_2$ the subject portion of the range image will appear in a portion 42 of region 34 which is intermediate portions 41 and 43.

Photosensor array 30 preferably comprises a CCD image sensing array or a photodiode image sensing array and may comprise a single row of photosensitive cells. In order to obtain sufficiently detailed electronic image representations, it is preferred to have the individual photocells of the array on the order of 0.0005 inch or less square and separated as little as possible, preferably less than 0.0005 inches. Readout of the image detected by photosensor array 30 can be achieved either serially cell by cell or in parallel, in accordance with the characteristics of the array. Serial readout takes more time than parallel readout, but allows utilization of a less complicated data reduction system than is required for parallel readout.

The amplitude of the response from a photocell is dependent upon the intensity of the light illuminating that photocell and on the period of time during which the photocell is allowed to integrate the incident light. If the integration time is too short, the electronic output from the photocells will be low. If integration times is longer, than the output from the photocells will be larger. Thus, the period over which the photocells are allowed to integrate the incident light can be used to compensate for different light intensities to which imaging array 30 may be subject when different objects are ranged.

The range to the object is determined by electronically correlating the electronic version of the subject image 52 with the electronic version of the range image 54 to determine the relative location of the corresponding portions of the subject and range images. Any correlation system may be used so long as it accomplishes this result.

In the preferred embodiment correlation is achieved by electronically comparing on a cell by cell basis the subject image 52 (as sensed by subject region 32) with the range image 54 (as sensed by range region 34). That is, if the subject region 32 comprises M photosensor cells and the range region 34 comprises N photosensor cells, the subject image is compared first with the image on the 1st through Mth photocells of range region 34, then with the second through M+1$^{th}$ photocells, then with the 3rd through M+2$^{th}$ photocells and so forth. The position within region 34 of the portion of the range image 54 which is most similar to the subject image 52 (in subject region 32) is a measure of the range to the object.

A preferred embodiment of a data reduction system for use in determining the range of an object from the raw data provided by optical system 10 is illustrated generally at 100 in FIG. 2.

Data reduction system 100 is designed to receive the information generated by image array 30 serially cell by cell. Data reduction system 100 operates under the control of a central control 120. The collection and readout of data by photosensor array 30 is controlled by a photosensor control 108. Under control of photosensor control 108 photosensor array 30 integrates the light comprising the subject and range images. Data is then read out of sensor array 30 serially photocell by photocell. It is preferred to convert analog data generated by photosensor array 30 to a digital form for processing. Consequently, a data quantizer 110 receives the analog electronic response of the individual photocells of array 30 serially cell by cell and quantizes that information with respect to a predetermined quantization standard. This quantization standard may be binary or may provide gray scale information in accordance with the degree of light intensity resolution desired for use in the image correlation process.

The quantized data provided by quantizer 110 is supplied to a data director 112 which directs the data to the succeeding processing circuitry in accordance with the information the data represent. Data director 112 discards the data from a portion 51 of the image which impinges on portion 31 of sensor array 30 because this data is not utilized for ranging purposes. Data director 112 directs those data representative of the subject image to a subject shift register 122. The subject data is preferably simultaneously applied to an events counter 114 which determines the number of photocells of the subject image portion 32 of sensor 30 which had a response in excess of a predetermined level. The count reached by event counter 114 is provided to a limits detector 116 which compares this count with upper and lower limits. Limit detector 116 provides an indication of whether the event count is below a minimum limit, between minimum and maximum limits or exceeds a maximum limit. If the event count is below the minimum limit, central control 120 causes the data to be discarded and causes the photosensor control 108 to increase the integration time of photosensor array 30 in order to increase the number of photocells which provide a response in excess of the predetermined level. If the event count exceeds the maximum limit, the central control 120 causes the data to be discarded and causes the photosensor control 108 to decrease the integration time of the photosensor array to reduce the number of photocells which provide a response in excess of the predetermined level. If the event count is between the minimum and maximum limits, processing of the data proceeds.

The limits on the number of events are imposed because a quantized image provides a maximum of information about the actual image when the quantized values are not almost all at the maximum or almost all at the minimum extremes. A quantization in which most of the values are at one extreme contains a minimum of information and does not provide a reliable basis for comparison of the subject image with the range image because the comparison is prone to errors due to noise and slight variations in photocell response. Thus, an electronic version of the image which contains a maximum of information is preferred.

After the subject image data from region 32 has been provided to subject shift register 122, data director 112 discards unused data 53 which are generated by the photocells which lie in the "unused" portion 33 of imager 30 between subject region 32 and range region 34. Data director 112 then directs the range image data from range region 34 to a range shift register 124. Thereafter, data director 112 discards the unused data 55 which follow the data resulting from the range image 54.

Subject shift register 122 and range shift register 124 are preferably recirculating shift registers which on each shift provide the data which is shifted out of the register both at their output terminal and to their own input so that the data shifted out is not lost from the shift register.

Once the data of the subject image 52 is stored in subject shift register 122 and the data of the range image 54 is stored in range shift register 124, a comparison is performed by a comparator 128 under the control of central control 120. This comparison is performed on a cell by cell basis as the data from corresponding cells of the subject image 52 and range image 54 are successively shifted into comparator 128. The number of cells which provide matching data are counted by a match counter 130 during each comparison of the subject image 52 and the portion of the range image contained in the given set of M successive cells. The more similar the image contained in the selected M cells of range image 54 is to the subject image 52 on a cell by cell basis, the greater will be the match count obtained by counter 130. If the match counter counts M matches during a single image comparison, then the data from every cell of the subject image 52 is identical to the data from corresponding cell of the selected M cells of the range image 54 and the subject image is identical to the selected portion of the range image.

Each time the subject image is compared with a set of M cells of the range image, the match count 130 is compared with the previous maximum match count by a match count comparator 132. If the match count associated with the most recent comparison is greater than the previous maximum match count, the maximum match count is replaced by the new, larger, maximum count in a maximum count register 134 and the location of the M cells of the range image which yielded this count is entered in a maximum count location register 136 which stores the location of the M cells of the range image which provided the current maximum count.

When the match count of match counter 130 is equal to the previous maximum count stored in register 134, no change is made in the maximum count stored in register 134, but a duplicate-match-count flip-flop 138 is set to indicate that two different sets of M cells of the range image 54 provide equally good matches with subject image 52. Each time the count in match counter 130 is larger than the previous count 134, the duplicate-match-count flip flop 138 is reset. When the count of match counter 130 is less than the match count stored in registers 134, no data changing action is taken and the next set of M cells of range image 54 are compared with the subject image 52.

Each time a comparison cycle is performed, subject shift register 122 shifts M cells of data so that at the beginning of each comparison cycle, data from the first cell of the subject image 52 is provided to comparator 128 as the first data for comparison. Each time a comparison cycle is performed, range shift register 124 shifts N+1 cells of data. Comparator 128 compares the first M cells of data provided by shift register 124 with the M cells of the data provided by subject shift register 122. The final N+1-M cells of data provided by shift register 124 are not utilized by comparator 128. Because range shift register 124 shifts N+1 cells of data each time a comparison cycle is performed, each successive comparison cycle begins with a range cell which is one cell further from the first range cell than the cell with which the previous comparison began. Thus, during the first comparison, the first range cell ($C_{R1}$) is compared with the first subject cell ($C_{S1}$), the second range cell $C_{R2}$ is compared with the second subject cell $C_{S2}$ and so on. During the second comparison cycle cell $C_{R2}$ is compared with cell $C_{S1}$, cell $C_{R3}$ is compared with cell $C_{S2}$ and so on. Thus, during successive comparison cycles the subject image is "aligned" one cell further from the first range cell ($C_{R1}$) and compared with the corresponding cells of the range image. During the (N+1−m)$^{th}$ comparison cycle cell $C_{R(N-M)}$ is compared with cell $C_{S1}$, cell $C_{R(N+2-M)}$ $_{2-M)}$ is compared with cell $C_{S2}$, . . . and cell $C_{RN}$ is compared with cell $C_{SM}$. At the end of the (N+1−m)$^{th}$ comparison cycle, subject image 52 has been compared with each portion of the range image which could correspond to it and since the final M bits of the range image 54 have been compared with the M bits of the subject image 52, the comparison process is complete.

Either continuously, as each new maximum count location is stored in register 136 or at the end of the comparison cycle, the location yielding the maximum count is provided to a Range Look Up Table 140 which converts the maximum count location to range in feet, meters, or whatever other unit may be desired.

If the duplicate match count flip flop 138 is set when the comparison process is complete, then two or more different sets of M bits of the range image 54 provided equally good matches to the subject image 52 and accurate range data has not been obtained. Under these conditions, central control 120 resets the counting and data registers and initiates a new image acquisition cycle. This reset does not change the integration time of the image sensor array 30. The image acquisition and comparison process as described above are then repeated.

If the duplicate match count flip flop 138 is not set at the end of a comparison cycle then central control 120 provides the range of the object being ranged to an optical system focus servo 160 and a display 164 through a control gate 162. When actuated, gate 162 gates the range supplied by range look-up table 140 to the servo 160 and display 164. In response to the information with respect to the range of the subject which is received from data reduction system 100, the optical system 160 adjusts the optical instrument to focus at the specified range.

If it is desired to determine range information on the basis of the average of several image acquisitions then match count comparator 132 may be a set of registers which store the match count generated for each set of M cells of the range image 54. The match counts for each set of M cells can be totaled over the desired number of data acquisition cycles and the location providing the maximum total count can be selected as indicating the subject range.

Data reduction system 100 is most easily implemented if the quantization standard applied by data quantizer 110 results in binary determinations and utilizes a median response of a photocell as a threshold reference against which to decide whether the information from the cell should be quantized as a binary 0 (cell response less than the threshold) or a binary 1 (cell response greater than the threshold). The median response ($R_M$) of a photocell is that response which is midway between the response generated in the absence of illuminating light ($R_o$) and the response ($R_S$) generated when the photocell response has saturated as a result of illumination by light of a greater intensity than that to which the photocell can respond in an intensity differentiating manner. Thus, the binary quantization threshold is preferably equal to ($R_S-r_o$)/2. When the response (R) is less than $$\left(\frac{R_s - R_o}{2}\right)$$

the response is quantized as a binary 0. Similarly when $$R \geq \frac{(R_s - R_o)}{2}$$

the response is quantized as a binary 1.

Where the data quantizer 110 is binary, event counter 114 will count binary ones in the subject image data. Subject shift register 122 will be M bits long and range shift register 122 will be N bits long.

It will be understood that a binary data quantization provides less sensitivity in image comparison than does a gray scale data quantization which yields multibit quantized representation of the response of each cell. A gray scale quantization which utilizes quantization thresholds of $$\frac{(R_S - R_o)}{4}, \left(\frac{R_S - R_o}{2}\right) \text{ and } 3\left(\frac{R_S - R_o}{4}\right)$$

will provide two bits of data with respect to the response R of each cell. A value of 00 can be generated when the response $$R < \frac{(R_S - R_o)}{4},$$

a value of 01 can be generated when $$\left(\frac{R_S - R_o}{4}\right) \leq R < 3\left(\frac{R_S - R_o}{2}\right)$$

a value of 10 can be generated when $$\left(\frac{R_S - R_o}{2}\right) \leq R < 3\left(\frac{R_S - R_o}{4}\right)$$

and a value of 11 can be generated when $$R \geq 3\left(\frac{R_S - R_o}{4}\right).$$

Thus, the response values 00 and 01 are assigned to responses which would be assigned value 0 in a binary system and values 10 and 11 are assigned to responses which could be assigned value 1 in a binary system. Thus, although a gray scale quantization system is more complicated than a binary system, a gray scale quantization system will provide more information than by a binary quantization system will. If two or more different segments of the range image provide equal match counts, then where gray scale quantization is utilized a further comparison can be performed between the subject data and the data segments of range image which provided equal maximum counts. In this further comparison, the degree of difference between the nonmatching data cells can be utilized to receive the question of which segment of the range image really provides the best match for the subject image.

Data reduction system 100 can be constructed as an integrated circuit in a single semiconductor chip. Image sensing array 30 may if desired be provided on the same semiconductor chip as data reduction system 100. Thus, the overall size of an automatic ranging system in accordance with the invention is essentially controlled by the spacing which must be provided between the lens 12 and the lens 14 in order that the range image would be viewed along sightlines having detectably different viewing angles if the object being ranged were moved far enough that the optical instrument would produce a blurred image if the focus were not adjusted.

In order to obtain maximum effectiveness, the automatic ranging system, in accordance with the invention, must have an accuracy which is greater than the depth of the optical instrument field of view. Otherwise, optical instrument blurring could result even though the optical instrument focus was set in accordance with the range data provided by the automatic ranging system.

To maximize ranging accuracy, ranging optical system 10 should be designed such that any image blurring on sensing array 30 which occurs either at the minimum or maximum functioning range of the automatic ranging system is less than the size of an individual photocell within the array 30. In these circumstances, lenses having a large depth of field should be utilized in optical system 10.

In order to obtain accurate comparison between the subject image 52 and the range image 54, the image sensing array 30 must be accurately aligned with respect to the optics 10 so that the portion of the subject image which impinges on subject portion 32 of array 30 is identical with that portion of the ranging image of the subject which impinges on the range portion 34 of array 30. Where the lenses 12 and 14 are displaced from each other along a horizontal line. A slight rotation of the sensor array 30 relative to optics 10 will cause the "subject image" and the "range image" which impinge on the photosensing array 30 to be from vertically displaced portions of the object which is being ranged. Such a misalignment may reduce the accuracy of the range determination made by the automatic ranging system.

In the embodiment of FIG. 1, if a vertical line were drawn on the object to be ranged in such a position that it fell in a transition region between two adjacent photocells of the subject image, then depending on the range of the object, that same vertical line could appear at the transition between two adjacent photocells in the range region 34 of imager 30, or it could appear anywhere along the width of a photocell. Thus, for some ranges to the object those features of the object which appear centered within photocells of the subject image are centered on the transition regions between photocells of the range image and vice versa. This characteristic can lead to poor range determination where an image contains sharp intensity fluctuations.

A photocell array for use in the embodiment of FIG. 1 which overcomes this problem is illustrated generally at 300 in FIG. 3. A first line 310 of photocells corresponds to the photocell array 30 in which equal sized photocells are uniformly spaced along the array by a distance which is equal to the width of the photocell. Thus, within a subject image region of the line 310, subject image photocells 310 are evenly spaced and within a range region 364 of the photosensor array the photocells 314 are evenly spaced as a continuation of the pattern in the subject image portion 362. Where a vertical line 350 on the object to be ranged lies in a transition region between adjacent subject photocells 312 in subject portion 362 of the array and also lies in a transition region between adjacent range photocells 314 in range portion 364 of the array as indicated by line 352 no misalignment problem exists. However, where the line 350 lies across a photocell in the range portion 364 of the array as indicated by lines 354, 356 or 358 a misalignment problem exists. This problem is solved as explained herein below.

A second line 320 of photosensors has a subject image portion 362 in which the photosensor cells 322 are in alignment with the photosensor cells 312 of the line 310. However, in the range image portion 364 of line 320 the photosensor cells 324 are each displaced relative to the photocells 314 in line 310 by one-third of the width of the photocell. The photocell size and separation in the range portion of line 320 is identical to that in line 310, except that at the transition point between subject region 362 and range region 364 the first range image photocell 324 is spaced from the last subject image photocell 322 by an integral multiple of the photocell spacing in subject region 362 plus one-third of the photocell width. Where vertical line 350 on the object to be ranged lies in the transition region between adjacent photocells of the subject image and in line 310 lies in the first one-third of a range photocell 314 as indicated by line 354, then the line 354 lies in the transition region between two adjacent photocells 324 in line 320 because of this displacement of the photocells of range region 364 of line 320. A third line 330 of photocells is similar to lines 310 and 320 in that within the subject image portion 362 of the line the subject image photocells 332 of line 330 are in alignment with subject image photocells 322 and 312 of lines 320 and 310. However, in the range image portion 364 the individual photocells 334 are displaced by one-third of the photocell width with respect to the photocells 324 of line 320 and by two-thirds of the photocell width with respect to the photocell 314 of line 310. Thus, where vertical line 350 on the object to be ranged lies in the transition region between adjacent photocells in a subject portion 362 of the array and in the middle third of a photocell 314 of line 310, that line will lie in the transition region between adjacent photocells 334 of line 330 as indicated by line 356. A fourth line 340 of photocells is similar to the other lines, with the exception that the photocells 344 of the range portion 364 of that lines are displaced by the entire width of a photocell relative to the photocells 314 of the range portion of line 310. Thus, where vertical line 350 on the object to be ranged lies in the transition region between adjacent photocells in the subject portion 362 of the array and in the final third of a photocell 314 of the range portion 364 of line 310, that vertical line will lie in the transition region between adjacent photocells 344 in the range portion 364 of line 340 as indicated by line 358.

Thus, the photocell array 300 of FIG. 3 provides the ability to align a subject portion of the range image relative to the photocells of the range region 364 in the same manner in which the subject image is aligned with respect to the photocell of subject portion 362.

There are several choices which may be made with respect to the data reduction system 100 when the photosensor array 300 is utilized instead of the photocell array 30.

First, the line 310 may be utilized and the data reduction system operated as described previously in order to obtain range data. So long as unambiguous range data is determined using line 310, the remaining lines of the photocell array are not utilized. If the photocell line 310 yields ambiguous range data, then, the data from line 320, rather than the data from line 310 is reduced by data reduction system 100. If line 320 also provides ambiguous range data, then line 330 is used and so. Thus, the first line which yields unambiguous range data is utilized in determining the range to the object.

Second, data reduction system 100 may operate successively on the data from lines 310, 320, 330 and 340 on four successive data reduction cycles with the maximum match count and the location of that match count for each line being stored along with the state of the duplicate match count flip flop 138 for each of the four lines. Then, the range determined by the line having the maximum match count which resulted in a match count flip flop 138 not being set is utilized to control the focus of the optical instrument.

Third, data reduction system 100 can be duplicated with the exception of central control 120 photosensor control 108, event counter 114 and limits detector 116 and the data from each of the photosensor lines may be reduced simultaneously. Here again, the range determination which will be used is the one from the line having the maximum match count and a duplicate match count flip flop which is not set. Using this technique, it is not necessary to duplicate limits detector 116 and event counter 114 because the subject image for each of the lines will be substantially identical.

Although the photosensor array 300 has been described in terms of the use of four lines photocells in which the separation between adjacent photocells is equal to the width of the photocells, it will be understood that similar techniques can be used in which a lesser or a greater number of lines are utilized and in which a separation between adjacent photocells are not equal to the width of the photocells.

FIG. 4 illustrates a photosensor array generally at 400 which may be utilized to yield raw data for a split image automatic range determination in accordance with the invention. In such a system the image is split along a line 405 between two adjacent rows of 410 and 420 of photocells. The data reduction technique for the raw data generated by this split image system is similar to the technique utilized with respect to the double image information provided in accordance with FIG. 1. However, in performing the data reduction the image focused on line 410 is treated as the subject image and the image focus on line 420 is treated as the range image. The optical system utilized to focus the "subject" and "range" images on the photosensor array 400 is of the type utilized in split image focusing cameras. Where the split image optical system is adjusted as the optical instrument focus is adjusted, the accuracy of the focus can be verified after focusing by establishing the match of the images focused on vertically aligned photocell of the lines 410 and 420.

The split image technique utilized in FIG. 4 requires accurate alignment of the photosensor array with respect to the optical image split line 405. If the line 405 is not accurately aligned with respect to the rows 410 and 420 of array 400, then the image split line 405 may fall on some photocells of one of the lines or the sensor array 400 may be displaced enough that both lines 410 and 420 of photocells are on the same side of image split line 405. The alignment tolerance required between the photosensor array and the image split line may be reduced where a photosensor array such as that illustrated generally at 500 in FIG. 5 is utilized in order to obtain data from both sides of the image split line 505 even though line 505 is misaligned with respect to the individual rows 510, 520, 530, and 540 of photocells. However, the resulting reduced tolerance on the alignment of the array 500 with respect to the image split line 505 requires a substantial increase in the complexity of the data reduction system used to reduce the range data.

The automatic focusing system in accordance with the invention is a substantial improvement over prior art focusing systems in that it is fully automatic, requires only a single lens adjustment to achieve focus, eliminates the need for lense adjustment during range determination and eliminates the need for the operator to make judgment decisions as to the clarity of an image. The elimination of operator judgment is a significant benefit because the operator judgment may be faulty as a result of eye strain, tiredness or peculiar lighting conditions.

Thus, a fully automatic ranging system for use with an optical instrument has been illustrated and described which provides automatic range determination without requiring adjustment of the optical instrument focus during range determination. Those skilled in the art may be able to vary and modify the detail of the preferred embodiment without departing from the invention. Thus, the preferred embodiment is illustrative only and not limitive. The protection afforded this invention is defined by the appended claims.

What is claimed is:

1. An automatic range determination system comprising:
    image sensing means for sensing an image focused thereon;
    optical means for focusing first and second images of an object the range of which is to be determined onto said image sensing means, said first and second images derived along different sightlines;
    quantization means for quantizing the data generated for each image element by said image sensing means;
    storage means for receiving and storing the quantized image data corresponding to said first and second images;
    comparison means for comparing on an element by element basis the stored quantized image data corresponding to said first image to the stored quantized image data corresponding to said second image and providing an output which is representative of the degree of similarity between the stored quantized image data for corresponding elements of the first and second images;
    control means for controlling operations performed during range determination sequences and for causing the comparator means to compare during a range determination sequence the stored data with respect to M successive elements of the first image in separate comparison sequences with the stored data for a plurality of different sets of M successive elements of said second image;
    alignment storage means for storing the relative alignment between the elements of the first image and the elements of the second image which yields an optimum comparison between the stored data;
    comparison optimization means for recognizing the alignment between the elements of said first image and said second image which, for the optimization criterion utilized, yields an optimum comparison between the elements of the first image and the elements of the second image.

2. The automatic range determination system recited in claim 1 wherein said optical means comprises:
    first optical channel means for focusing said first image of said object whose range is to be determined onto a first portion of said image sensing means; and
    second optical channel means for focusing said second image of said object whose range is to be determined onto a second portion of said image sensing means, said second optical channel means displaced from said first optical channel means so that said images are derived along different sightlines.

3. The system recited in claim 1 wherein said image sensing means comprises an array of photocells.

4. The system recited in claim 3 wherein:
    said photocells are arranged in rows;
    said first image is focused on a first portion of a selected row of photocells, and
    said second image is focused on a second portion of said selected row of photocells.

5. The system recited in claim 3 wherein:
    said array is two-dimensional;
    said photocells are arranged in substantially parallel rows, each row including a plurality of uniformly spaced photocells and at least some of said photocells of a first row are positioned in the interstices between cells of the second row in the sense that if a first line is drawn through the photocells of said first row and a second line is drawn perpendicular to said first line and through a photocell in said first row, then the second line will not intersect a photocell in the second row.

6. The system recited in claim 2 wherein said first optical channel means and said second optical channel means are both folded in order to minimize the overall size of said first and said second optical channel means.

7. The range determination system recited in claim 1 wherein said comparison means provides for each comparison between the data stored for an element of the first image and the data stored for an element of the second image a first output indicating a match if the stored data being compared are identical and a second output otherwise.

8. The system recited in claim 7 wherein said comparison optimization means comprises:
    match counter means coupled to said comparison means for counting the number of matches between the elements of said first image and the elements of said second image during each comparison sequence and;
    match count comparator means for determining the largest match count.

9. The range determination system recited in claim 1 further comprising:
    means for determining, from the alignment stored in said alignment storage means at the end of the alignment determination sequence, the range of the object the range of which is to be determined.

10. A method of automatically determining the range of an object comprising the steps of:
    deriving first and second images of said object along different sightlines;
    electronically sensing and quantizing said first and second images to produce a first quantized electronic version of said first image and a second quantized electronic version of said second image;
    storing said first and second quantized versions of said images;
    electronically correlating said first and second electronic versions of said images to determine the relative location of corresponding portions of said first and second images, said correlation process comprising:

comparing M successive elements of said stored version of said first image with a plurality of different sets of M successive elements of said stored version of said second image to determine the degree of similarity between said stored data for said M successive elements of said first image and said stored data for each of said plurality of sets of M successive elements of said second image;

determining from the results of the comparison process which set of M successive elements of said second image is most similar to said M successive elements of said first image in accordance with the comparison criterion utilized;

determining from the location within the second image of said set of M successive elements of said second image which is most similar to said M successive elements of said first image, the range of the object the range of which is to be determined.

11. An automatic range determination system comprising:

image sensing means comprising an array of photoresponsive cells for sensing an image focused thereon;

optical means for focusing first and second images of an object, the range of which is to be determined, onto said image sensing means, said first and second images derived along different sightlines and each comprised of a plurality of image elements;

quantization means for quantizing the data generated for each image element by said image sensing means;

first and second shift registers for receiving the quantized image data corresponding to said first image and said second image, respectively;

said first shift register containing M storage locations and said second shift register containing N storage locations, wherein $N>M$;

comparator means for comparing the image data stored in said first shift register with the image data stored in said second shift register on an element by element basis and providing a first output indicating a match when the stored data being compared are identical and a second output when the stored data are not identical;

match counter means coupled to said comparison means for counting the number of matches between the elements of said image stored in said first shift register and the elements of said image stored in said second shift register;

match count comparator means for determining the largest match count during a range determination sequence;

alignment storage means for storing the alignment which yields said largest comparison sequences, the data contained count;

control means for controlling an alignment determination sequence and for causing the information in the M cells of said first shift register to be compared with, in separate comparison sequences, the data contained in each set of M successive storage locations in said second shift register in order that the relative alignment of said first and said second images which provides the highest match count may be determined; and means for determining, from the alignment stored in said alignment storage means at the end of the comparison sequence, the range of the object the range of which is to be determined.

* * * * *